US012282836B2

(12) United States Patent
Ahuja et al.

(10) Patent No.: US 12,282,836 B2
(45) Date of Patent: Apr. 22, 2025

(54) LEARNING ROBUST PREDICTORS USING GAME THEORY

(71) Applicant: INTERNATIONAL BUSINESS MACHINES CORPORATION, Armonk, NY (US)

(72) Inventors: Kartik Ahuja, White Plains, NY (US); Karthikeyan Shanmugam, Elmsford, NY (US); Kush Raj Varshney, Ossining, NY (US); Amit Dhurandhar, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1170 days.

(21) Appl. No.: 17/115,489

(22) Filed: Dec. 8, 2020

(65) Prior Publication Data

US 2022/0180254 A1 Jun. 9, 2022

(51) Int. Cl.
*G06N 20/20* (2019.01)
*G06N 7/00* (2023.01)

(52) U.S. Cl.
CPC .............. *G06N 20/20* (2019.01); *G06N 7/00* (2013.01)

(58) Field of Classification Search
CPC ................................ G06N 20/20; G06N 7/00
See application file for complete search history.

(56) References Cited

U.S. PATENT DOCUMENTS 7,668,790 B2 * 2/2010 Barbu .................. G06V 10/774
706/25
8,126,575 B2 2/2012 Attarwala
(Continued)

FOREIGN PATENT DOCUMENTS

CN 106547993 A 3/2017
CN 110411278 A 11/2019
(Continued)

OTHER PUBLICATIONS

H. Ykhlef, D. Bouchaffra and F. Ykhlef, "Selection of Optimal Sub-ensembles of Classifiers through Evolutionary Game Theory," 2019 IEEE International Conference on Systems, Man and Cybernetics (SMC), Bari, Italy, 2019, pp. 2267-2272 (Year: 2019).*
(Continued)

*Primary Examiner* — Shahid K Khan
(74) *Attorney, Agent, or Firm* — Rakesh Roy

(57) ABSTRACT

A method, computer system, and a computer program product for invariant risk minimization games is provided. The present invention may include defining a plurality of environment-specific classifiers corresponding to a plurality of environments. The present invention may also include constructing an ensemble classifier associated with the plurality of environment-specific classifiers. The present invention may further include initiating a game including a plurality of players corresponding to the plurality of environments. The present invention may also include calculating a nash equilibrium of the initiated game. The present invention may further include determining an ensemble predictor based on the calculated nash equilibrium. The present invention may include deploying the determined ensemble predictor associated with the calculated nash equilibrium to make predictions in a new environment.

18 Claims, 7 Drawing Sheets

(56) References Cited

U.S. PATENT DOCUMENTS

| | | | | |
|---|---|---|---|---|
| 9,171,259 | B1* | 10/2015 | Laxmanan | G06N 5/022 |
| 10,885,393 | B1* | 1/2021 | Sirianni | G06F 18/2411 |
| 2006/0026110 | A1* | 2/2006 | Fan | G06N 20/00 |
| | | | | 706/12 |
| 2016/0180240 | A1* | 6/2016 | Majumdar | G06N 3/006 |
| | | | | 706/46 |
| 2018/0240043 | A1* | 8/2018 | Majumdar | H04L 41/046 |
| 2019/0095805 | A1* | 3/2019 | Tristan | G06N 5/045 |
| 2019/0188615 | A1 | 6/2019 | Liu | |
| 2019/0354100 | A1* | 11/2019 | Lopez Mejia | G06N 3/006 |
| 2020/0005176 | A1 | 1/2020 | Imazawa | |
| 2020/0210842 | A1* | 7/2020 | Baker | G06N 3/044 |
| 2020/0364624 | A1* | 11/2020 | Kearney | G06F 18/256 |

FOREIGN PATENT DOCUMENTS

| | | | | |
|---|---|---|---|---|
| WO | WO-2019210303 | A1 * | 10/2019 | G06F 17/11 |
| WO | 2019233231 | A1 | 12/2019 | |

OTHER PUBLICATIONS

Arjovsky, Martin, et al. "Invariant risk minimization." arXiv preprint arXiv:1907.02893 (2019) (Year: 2019).*

Dasgupta, P. and Collins, J., 2019. A survey of game theoretic approaches for adversarial machine learning in cybersecurity tasks. AI Magazine, 40(2), pp. 31-43. (Year: 2019).*

Zhang, R. and Zhu, Q., 2018. A game-theoretic approach to design secure and resilient distributed support vector machines. IEEE transactions on neural networks and learning systems, 29(11), pp. 5512-5527. (Year: 2018).*

Arjovsky et al., "Invariant risk minimization," arXiv:1907.02893v3 [stat.ML] Mar. 27, 2020, https://arxiv.org/pdf/1907.02893.pdf, 31 pages.

Grace Period Disclosure: "Invariant Risk Minimization Games," Kartik Ahuja, Karthikeyan Shanmugam, Kush Varshney and Amit Dhurandhar, Published Feb. 11, 2020, arXiv:2002.04692v1 [cs.LG].

Mell et al., "The NIST Definition of Cloud Computing", National Institute of Standards and Technology, Special Publication 800-145, Sep. 2011, 7 pages.

Peters et al. "Causal inference by using invariant prediction: identification and confidence intervals," arXiv:1501.01332v3 [stat.ME] Nov. 24, 2015, 51 pages.

* cited by examiner

LEARNING ROBUST PREDICTORS USING GAME THEORY

STATEMENT REGARDING PRIOR DISCLOSURES BY THE INVENTOR OR A JOINT INVENTOR

The following disclosure is submitted under 35 U.S.C. § 102(b)(1)(A): "Invariant Risk Minimization Games," Kartik Ahuja, Karthikeyan Shanmugam, Kush Varshney, and Amit Dhurandhar, Feb. 11, 2020.

BACKGROUND

The present invention relates generally to the field of computing, and more particularly to machine learning.

Machine learning is a field of artificial intelligence (AI) which enables computers to learn from, and make decisions, based on data without being explicitly programmed. Generally, a machine learning algorithm may be used to build a model which maps known inputs to unknown outputs in a set of training data. In environments in which the distribution between the training data and testing data are the same and/or similar, current models—based on the standard risk minimization paradigm—may perform well. However, these models, which often rely on learning spurious features, may fail to produce accurate predictions in environments where the distribution between the training data and testing data are different.

SUMMARY

Embodiments of the present invention disclose a method, computer system, and a computer program product for invariant risk minimization games. The present invention may include defining a plurality of environment-specific classifiers corresponding to a plurality of environments. The present invention may also include constructing an ensemble classifier associated with the plurality of environment-specific classifiers. The present invention may further include initiating a game including a plurality of players corresponding to the plurality of environments. The present invention may also include calculating a nash equilibrium of the initiated game. The present invention may further include determining an ensemble predictor based on the calculated nash equilibrium. The present invention may include deploying the determined ensemble predictor associated with the calculated nash equilibrium to make predictions in a new environment.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
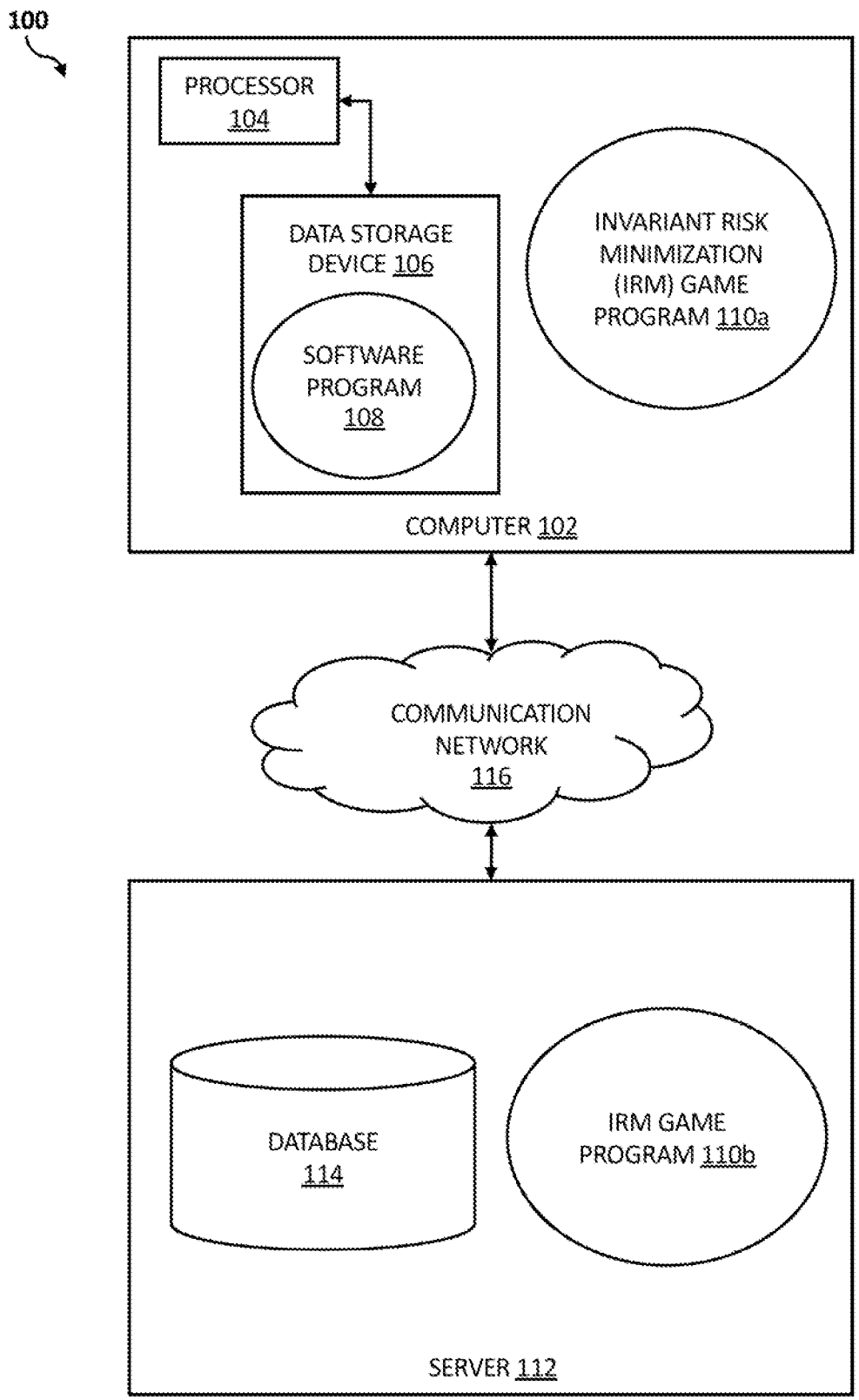
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for game-theoretic machine learning algorithms. As such, the present embodiment has the capacity to improve the technical field of machine learning by training on data from many environments and finding invariant predictors which may reduce the effect of spurious features by concentrating models on features that have a causal relationship with the outcome. Accordingly, a computing device may be utilized to train a machine learning model which operates invariantly in a plurality of environments. More specifically, a computing device may define one or more classifiers specific to one or more environments, of a plurality of environments. Then, the computing device may construct one or more ensemble classifiers related to all of the one or more classifiers specific to the one or more environments. Next, the computing device may define a game, the game having as players each of the environments of the plurality of environments. Then, the computing device may determine, using best response dynamics, a Nash equilibrium of the game. Thereafter, the computing device, may determine an ensemble predictor at the Nash equilibrium. The computing device may then deploy the ensemble predictor to make predictions in a new environment including unseen data.

As described previously, a machine learning algorithm may be used to build a model which maps known inputs to unknown outputs in a set of training data. In environments in which the distribution between the training data and testing data are the same and/or similar, current models—based on the standard risk minimization paradigm—may perform well. However, these models, which often rely on learning spurious features, may fail to produce accurate predictions in environments where the distribution between the training data and testing data are different.

The annals of machine learning are rife with examples of spurious correlations that fail to hold outside of a specific training (and identically distributed test) distribution. In one such case, a convolutional neural network (CNN) was trained to classify camels from cows. However, the training dataset had one source of bias, i.e., most of the pictures of cows were in green pastures, while most pictures of camels were in deserts. The CNN picked up the spurious correlation, i.e., it associated green pastures with cows and failed to classify pictures of cows on sandy beaches correctly. In another case, a neural network used a brake light indicator to continue applying brakes, which was a spurious correlation in the training data.

To address the problem of models inheriting spurious correlations, one existing technique tries to exploit the varying degrees of spurious correlation naturally present in data collected from multiple data sources to learn robust predictors. The goal of this existing technique is to find a representation such that an optimal classifier, given the representation, is invariant across training environments. However, this formulation leads to a challenging bi-level optimization problem, which is relaxed by limiting the classifier to a simple linear classifier and learning a representation such that the classifier is "approximately locally optimal" in all the training environments.

Therefore, it may be advantageous to, among other things, provide a way to generate predictors, based on classifiers that are not restricted to linear classifiers, which may operate invariantly in a large number of environments. It may also be advantageous to generate predictors providing better performance with much lower standard deviation than existing techniques.

According to at least one embodiment, an ensemble of classifiers may be created with each environment controlling one component of the ensemble. Each environment may use the entire ensemble to make predictions. According to at least one embodiment, all the environments may play a game where each environment's action is to decide its contribution to the ensemble such that the environment minimizes its risk. In disclosed embodiments, the set of predictors that solve the ensemble game may be equal to the set of invariant predictors across the training environments. This result holds for a large class of nonlinear classifiers.

According to at least one embodiment, a training algorithm may be used to solve the game by implementing best response dynamics. Under this implementation, each environment may periodically take its turn and move its classifier in the direction that minimizes the risk specific to that environment. Empirically, the invariant predictors found using this approach may lead to better or comparable performance with much lower standard deviation than any existing methods on several different datasets. Moreover, as noted previously, the disclosed embodiments do not restrict classifiers to be linear.

Statistical machine learning has dealt with the distribution shift between the training distribution and test distribution in a number of ways. Conventional approaches may include sample weighting, domain adaptation, and robust optimization. Importance weighting, or more generally sample weighting, may attempt to match training and testing distributions by reweighting samples. It typically assumes that the probability of labels given all covariates does not shift, and in more general cases, requires access to test labels. Domain adaptation tries to find a representation whose distribution is invariant across source and target domains. Domain adaptation is known to have serious limitations even when the distribution of labels shifts marginally across environments. When only training data sources are given, robust optimization techniques find the worst-case loss over all possible convex combinations of the training sources. This assumes that the test distribution is within the convex hull of training distributions, which is not true in many settings.

Embodiments of the present disclosure may implement various concepts of game theory, as will be further discussed. In one embodiment, a standard normal form game may be implemented. A standard normal form game may be represented by a tuple: $\Gamma=(N, \{S_i\}_{i \in N}, \{u_i\}_{i \in N})$, where N is a finite set of players. Player $i \in N$ may take actions from a strategy set $S_i$. The utility of player i may be represented by $u_i:S \to \mathbb{R}$, where the joint set $S=\Pi_{i \in N} S_i$. The joint strategy of all the players may be given as $s \in S$, the strategy of player i may be represented by $s_i$ and the strategy of the rest of players may be represented by $s_{-i}=(s_i)_{i' \neq i}$. If the set of strategies S is finite, then the game $\Gamma$ may be identified as a finite game. However, if the set of strategies S is uncountably infinite, then the game $\Gamma$ may be identified as a continuous game. According to one embodiment, a strategy $s^*$ may be a pure strategy Nash equilibrium (NE) if it satisfies:

$$u_i(s_i^*, s_{(-i)}^*) \geq u_i(k, s_{(-i)}^*), \forall k \in S_i, \forall i \in N$$

Embodiments of the present disclosure may also implement various concepts of invariant risk minimization (IRM). IRM may consider datasets $\{(x_i^e, y_i^e)\}_{i=1}^{n_e}$ from multiple training environments $e \in \varepsilon_{tr}$. The feature value may be represented by $x_i^e \in X$ and the corresponding labels may be represented by $y_i^e \in \mathcal{Y}$, where X may be $X \subseteq \mathbb{R}^n$ and $\mathcal{Y}$ may be $\mathcal{Y} \subseteq \mathbb{R}^k$. Based on the above, a predictor may be represented as $f:X \to \mathbb{R}^k$.

According to one embodiment, one goal of IRM may be to use these multiple datasets to construct a predictor $f$ that performs well across many unseen environments $\mathcal{E}_{all}$, where $\mathcal{E}_{all} \supseteq \varepsilon_{tr}$. In one embodiment, the risk achieved by $f$ in environment e may be defined as $R^e(f)=\mathbb{E}_{X^e, Y^e}[\ell(f(X^e), Y^e)]$ where $\ell$ may represent the loss when $f(X)$ is the predicted value and Y is the corresponding label. To assume that $f$ maps to real values is not restrictive; for instance, in a k-class classification problem, the output of the function $f$ may include the score for each class, which may then be converted into a hard label by selecting the class with the highest score.

According to one embodiment, a data representation $\Phi: X \to \mathcal{Z} \subseteq \mathbb{R}^d$ may elicit an invariant predictor $w \cdot \Phi$ across environments $e \in \varepsilon$ if there is a classifier $w: \mathcal{Z} \to \mathbb{R}^k$ that achieves the minimum risk for all the environments:

$$w \in \arg\min_{\overline{w} \in \mathcal{H}_w} R^e(\overline{w} \circ \Phi),$$

$\forall e \in \varepsilon$. The set of all the mappings $\Phi$ is given as $\mathcal{H}_\Phi$ and the set of all the classifiers is given as $\mathcal{H}_w$. IRM may be phrased as the following constrained optimization problem (1):

$$\min_{\Phi \in \mathcal{H}_\Phi, w \in \mathcal{H}_w} \sum_{e \in \varepsilon_{tr}} R^e(w \circ \Phi)$$

$$\text{s.t. } w \in \arg\min_{\overline{w} \in \mathcal{H}_w} R^e(\overline{w} \circ \Phi),$$

$$\forall e \in \varepsilon_{tr}$$

If a predictor $w \cdot \Phi$ satisfies the constraints above, then it may be an invariant predictor across all of the training environments $\varepsilon_{tr}$. However, optimization problem (1) may be quite challenging to solve. Accordingly, embodiments of the present disclosure introduces an alternate characterization for solving optimization problem (1) based on game theory.

According to one embodiment of the present disclosure, each environment may control its own classifier $w^e \in \mathcal{H}_w$. In one embodiment, an ensemble may be implemented to construct an overall classifier $w^{av}: \mathcal{Z} \to \mathbb{R}^k$ defined as $$w^{av} = \frac{1}{|\varepsilon_{tr}|} \sum_{q=1}^{|\varepsilon_{tr}|} w^q,$$

where for each $z \in \mathcal{Z}$, $$w^{av}(z) = \frac{1}{|\varepsilon_{tr}|} \sum_{q=1}^{|\varepsilon_{tr}|} w^q(z).$$

(The av stands for average.) In one example of binary classification with two environments $\{e_1, e_2\}$, $w^e = [w_1^e, w_2^e]$ may represent the classifier of environment e, where each component may include the score for each class. In the above example, a component j of the ensemble classifier $w^{av}$ may be defined as $$w_j^{av} = \frac{w_j^{e_1} + w_j^{e_2}}{2}.$$

These scores may then be input into a softmax function. In one embodiment, the final probability assigned to class j for an input z may be represented by $$\frac{e^{w_j^{av}(z)}}{e^{w_1^{av}(z)} + e^{w_2^{av}(z)}}.$$

According to one embodiment, all of the environments may be required to use the ensemble classifier $w^{av}$, resulting in the following new optimization problem (2):

$$\min_{\Phi \in \mathcal{H}_\Phi, w^{av} \in \mathcal{H}_w} \sum_{e \in \varepsilon_{tr}} R^e(w^{av} \circ \Phi)$$

$$\text{s.t. } w^e \in \arg\min_{\overline{w^e} \in \mathcal{H}_w} R^e\left(\frac{1}{|\varepsilon_{tr}|}\left[\overline{w^e} + \sum_{q \neq e} w^q\right] \circ \Phi\right),$$

$$\forall e \in \varepsilon_{tr}$$

According to one embodiment, optimization problem (2) may be equivalently restated as the following formulation (3):

$$\min_{\Phi \in \mathcal{H}_\Phi, w^{av}} \sum_{e \in \varepsilon_{tr}} R^e(w^{av} \circ \Phi)$$

$$\text{s.t. } R^e\left(\frac{1}{|\varepsilon_{tr}|}\left[w^e + \sum_{q \neq e} w^q\right] \circ \Phi\right) \leq R^e\left(\frac{1}{|\varepsilon_{tr}|}\left[\overline{w^e} + \sum_{q \neq e} w^q\right] \circ \Phi\right) \forall \overline{w^e} \in \mathcal{H}_w,$$

$$\forall e \in \varepsilon_{tr}$$

It is contemplated that the above formulation (3) may be advantageous for multiple reasons. For example, using the ensemble classifier $w^{av}$ may automatically enforce that the same classifier is used across all of the environments. Further, each environment may be free to select the classifier $w^e$ from the entire set of classifier $\mathcal{H}_w$, unlike in optimization problem (1), where all of the environments are required to choose the same classifier. Additionally, the constraints in formulation (3) are equivalent to the set of a pure Nash equilibrium strategy of a game that will be further detailed below.

According to one embodiment, the disclosed game may be played between $|\varepsilon_{tr}|$ players (e.g., set of training environments), with each player corresponding to an environment e. In one embodiment, the set of actions available to each environment e may be defined by $w^e \in \mathcal{H}_w$ (e.g., a respective environment-specific classifier of a set of classifiers). At the start of a game, a data representation $\Phi$ may be selected from the set of all data representations $\mathcal{H}_\Phi$ and may be observed by all the environments. In one embodiment, the utility function for an environment e may be defined as $u_e[w^e, w^{-e}, \Phi] = -R^e(w^{av}, \Phi)$ where $w^{-e} = \{w^q\}_{q \neq e}$ may include the set of choices of all environments but environment e. This game may be referred to as an Ensemble Invariant Risk Minimization (EIRM) and expressed as the following tuple:

$$\Gamma^{EIRM} = (\varepsilon_{tr}, \mathcal{H}_\Phi, \{\mathcal{H}_w\}_{q=1}^{|\varepsilon_{tr}|}, \{u_e\}_{e \in \varepsilon_{tr}}).$$

According to one embodiment, a pure Nash equilibrium strategy may be represented as a tuple $(\Phi, \{w^q\}_{q=1}^{|\varepsilon_{tr}|})$. It is contemplated that each pure Nash equilibrium may depend on the representation $\Phi$. Accordingly, representation $\Phi$ may be include as a part of the tuple representing the pure Nash equilibrium. In one embodiment, the set of pure Nash equilibria may be defined as $S^{EIRM}$. Further, a set of all the ensemble predictors constructed from the Nash equilibria may be defined as:

$$\hat{S}^{EIRM} = \left\{ \left[\frac{1}{|\varepsilon_{tr}|} \sum_{q=1}^{|\varepsilon_{tr}|} w^q\right] \circ \Phi \,\middle|\, \Phi, \{w^q\}_{q=1}^{|\varepsilon_t|} \in S^{EIRM} \right\}$$

According to one embodiment, members of the set of pure Nash equilibria $S^{EIRM}$ may be equivalently expressed as the solutions to the following formulation (4):

$$u_e[w^e, w^{-e}, \Phi] \geq u_e[\overline{w^e}, w^{-e}, \Phi], \forall w^e \in \mathcal{H}_w, \forall e \in \varepsilon_{tr}.$$

According to one embodiment, if $u_e[w^e, w^{-e}, \Phi]$ is replaced with $-R^e(w^{av}, \Phi)$ in the above formulation (4), the inequalities of formulation (3) may be obtained.

According to at least one embodiment, various strategies may be used to compute the pure Nash equilibrium of the game $\Gamma^{EIRM}$. In one embodiment, a best response dynamics strategy may be implemented given its intuitive and natural structure.

In a first best response dynamics approach (FIG. 2), a fixed representation $\Phi$ may be used. In one embodiment, the representation $\Phi$ may be fixed to be identity mapping. In another embodiment, the representation $\Phi$ may be selected as some other mapping such as an approximation of a map for Gaussian kernel. Once the representation $\Phi$ is fixed, the environments may play according to best response dynamics as follows: Each environment may take its turn (in a periodic manner with each environment going once) and minimize its respective objective. This process may be repeated until a certain criterion is achieved, e.g., maximum number of epochs or desired value of training accuracy. The above approach may not provide an opportunity to optimize representation $\Phi$. In one embodiment, the upper-level optimization objective in formulation (3) may be used as a way to guide search for representation $\Phi$.

In a second best response dynamics approach (FIG. 3), the representation $\Phi$ may be updated periodically by the representation learner using the objective in formulation (4). According to one embodiment, between two updates of the representation Φ, the environments may play according to best response dynamics as described above. An exemplary algorithm of a best response training process is detailed in Table (1) below:

---

Algorithm: Best Response Training

---

Input: Data for each environment and combined data
Initialize: Randomly initialize $\{w_{cur}^{e}\}_{e=1}^{|\mathcal{E}_{tr}|}$ and $\Phi_{cur}$
from $\mathcal{H}_w$ and $\mathcal{H}_\Phi$ respectively
while iter ≤ iter$_{max}$ do
  if Fixed − Phi then
    $\Phi_{cur} = I$
  end if
  if Variable − Phi then
    $\Phi_{cur} = SGD[\Sigma_e R^e(w_{cur}^{av} \circ \Phi_{cur})]$, SGD[.]: step
    update using stochastic gradient descent
  end if
  for p ∈ {1, . . K} do
    for e ∈ {1, . . . , |$\mathcal{E}_{tr}$|} do
      $w_{cur}^{e} = SGD[R^e(w_{cur}^{av} \circ \Phi_{cur})]$ $$w_{cur}^{av} = \frac{1}{|\mathcal{E}_{tr}|}\sum_e w_{cur}^e$$

end for
  iter = iter + 1
  end for
end while

---

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a invariant risk minimization (IRM) game program 110a. The networked computer environment 100 may also include a server 112 that is enabled to run a IRM game program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the IRM game program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the IRM game program 110a, 110b (respectively) to generate one or more predictors which may provide out of distribution generalization and operate invariantly in previously unseen environments. The IRM game system and method are explained in more detail below with respect to FIGS. 2 to 4.

Figure 2:
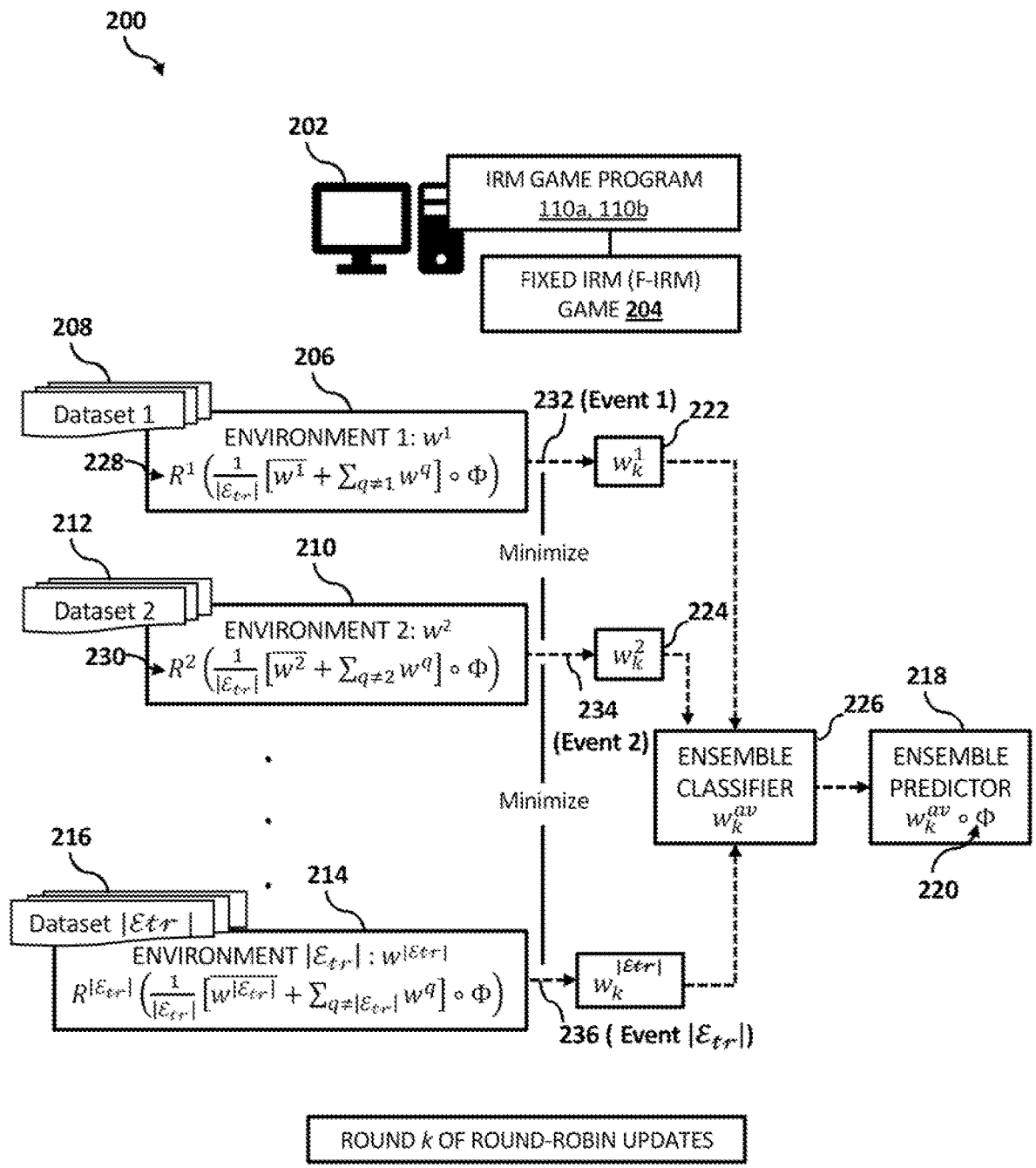
FIG. 2 is a schematic block diagram of a first machine learning environment according to at least one embodiment.

Referring now to FIG. 2, a schematic block diagram of a first machine learning environment 200 implementing the IRM game program 110a, 110b according to at least one embodiment is depicted. According to one embodiment, first machine learning environment 200 may include one or more components (e.g., client computer 102; server computer 112; communication network 116) of the computer environment 100 discussed above with reference to FIG. 1.

According to one embodiment, environment 200 may include one or more computer systems 202 running the IRM game program 110a, 110b. According to one embodiment, the computer systems 202 running the IRM game program 110a, 110b may include specialized computing devices for machine learning. In various embodiments, the computer systems 202 associated with the IRM game program 110a, 110b may include a workstation, a personal computing device, a laptop computer, a desktop computer, a thin-client terminal, a tablet computer, a smart telephone, a smart watch or other smart wearable, or other electronic devices.

According to one embodiment, the IRM game program 110a, 110b may be stored in a tangible storage device of computer system 202 and executed using a processor associated with computer system 202. In one embodiment, the IRM game program 110a, 110b may include a single computer program or multiple program modules or sets of instructions being executed by the processor of the associated computer system 202. The IRM game program 110a, 110b may include routines, objects, components, units, logic, data structures, and actions that may perform particular tasks or implement particular abstract data types. The IRM game program 110a, 110b may be practiced in distributed cloud computing environments where tasks may be performed by remote processing devices which may be linked through the communication network (e.g., communication network 116). In one embodiment, the IRM game program 110a, 110b may include program instructions that may be collectively stored on one or more computer-readable storage media.

As described previously, the standard risk minimization paradigm of machine learning may be brittle when operating in environments where test data distributions are often different from the training data distributions. Training data in a single environment may include a source of bias which may lead a machine learning model to learn spurious correlations instead of the causative features. Training on data from many environments and finding invariant predictors may reduce the effect of spurious features by concentrating models on features that have a causal relationship with the outcome.

According to one embodiment, the IRM game program 110a, 110b may address the problem of models inheriting spurious correlations by exploiting the varying degrees of spurious correlations naturally present in data collected from multiple data sources to learn a robust predictor using a game-theoretic perspective. In machine learning environment 200, IRM game program 110a, 110b may implement a fixed IRM (F-IRM) game 204 to provide fixed representation based best response training, as will be further detailed below.

According to one embodiment, IRM game program 110a, 110b may implement one or more environments (may also be referred to as training environments) associated with corresponding datasets (may also be referred to as training datasets). As illustrated in FIG. 2, IRM game program 110a, 110b may define a first environment 206 (e.g., environment 1) including a first dataset 208 (e.g., dataset 1) and a second environment 210 (e.g., environment 2) including a second dataset 212 (e.g., dataset 2). In various embodiments, IRM game program 110a, 110b may define any number of additional environments 214 (e.g., environment $|\varepsilon_{tr}|$, where $|\varepsilon_{tr}|$ may refer to the total number of training environments) and a corresponding number of additional datasets 216 (e.g., dataset $|\varepsilon_{tr}|$). The various environments (e.g., first environment 206, second environment 210) may operate on a same computer system (e.g., computer system 202) or may be implemented using different computer systems linked through the communication network.

In one embodiment, the respective datasets (e.g., first dataset 208, second dataset 212) may be received by the corresponding environments (e.g., first environment 206, second environment 210) from various locations (e.g., environment 1 may receive dataset 1 from a first hospital location; environment 2 may receive dataset 2 from a second hospital location). The data across the respective datasets may be different such that each environment (e.g., first environment 206, second environment 210) may include an arbitrary distribution of data. By implementing the above-described set of training environments receiving the corresponding datasets (having arbitrary distribution of data), the IRM game program 110a, 110b may construct a predictor, such as, for example an ensemble predictor 218, which may perform well (e.g., invariantly) across many new (e.g., unseen) environments, where the new environments may represent a superset of the set of training environments.

According to one embodiment, a predictor (e.g., w·Φ), such as, for example the ensemble predictor 218 may be composed of a classier (w) and a data representation or representation (Φ). In one embodiment, a classifier may refer to an algorithm that maps an input data to an output label (e.g., indicating a specific class or category) and the data representation may refer to a transformation of the raw input data which may enable the classifier to predict the output label based on learning features of the input data.

According to one embodiment, the ensemble predictor 218 may be generated as an output for solving the invariant risk minimization (IRM) game (e.g., ensemble invariant risk minimization game) initiated by the IRM game program 110a, 110b. Generally, the IRM game may be played between the set of environments (e.g., first environment 206, second environment 210), where each player may correspond to a respective environment (e.g., first player=first environment 206).

According to one embodiment, the ensemble predictor 218 may be composed of a classier (w) and the representation (Φ), as previously described. At the initialization of the game, the IRM game program 110a, 110b may define the representation or representation learner 220 (e.g., Φ), which may be observed by all the of the environments taking part in the IRM game. In one embodiment, the IRM game program 110a, 110b may include two approaches to the IRM game. The first approach, illustrated in FIG. 2, may be referred to as a fixed representation based best response training (FIRM game 204) and a second approach, which will be described with reference to FIG. 3, may be referred to as a variable representation based best response training (variable IRM (V-IRM) game 302).

When playing the F-IRM game 204, as in FIG. 2, the IRM game program 110a, 110b may fix the representation 220 to an identify function (e.g., Φ=1). As a result of the representation 220 being fixed, the ensemble predictor 218 generated from F-IRM game 204 may be defined by the ensemble classifier 226, as will be further detailed below.

Continuing with the FIRM game 204, the IRM game program 110a, 110b may endow each environment (e.g., first environment 206, second environment 210) with its own environment-specific classifier, which may be selected from a set of all classifiers (e.g., linear and non-linear classifiers). For example, the first environment 206 may select (or be assigned) a first environment-specific classifier 222 (e.g., $w_k^1$) and the second environment 210 may select (or be assigned) a second environment-specific classifier 224 (e.g., $w_k^2$). The subscript k may refer to a version of the environment-specific classifier at a particular round of round-robin updates, as will be further detailed below.

According to one embodiment, the IRM game program 110a, 110b may construct an average or ensemble classifier 226 (e.g., $w_k^{av}$) based on the environment-specific classifiers (e.g., first environment-specific classifier 222, second environment-specific classifier 222) associated with the multiple environments (e.g., first environment 206, second environment 210). In at least one embodiment, the environment-specific classifiers (e.g., first environment-specific classifier 222, second environment-specific classifier 222) may be provided as components of the ensemble classifier 226, such that the ensemble classifier 226 may be calculated as an aggregation or average of the individual components (e.g., environment-specific classifiers).

According to one embodiment, constructing the ensemble classifier 226 may involve averaging the logits produced by each environment-specific classifier. According to one embodiment, a classifier may map a point x (e.g., input) to a set of C reals (e.g., referred to as logits), where the set of C may represent the number of classes in a classification problem. In one embodiment of this classification problem, a softmax operation may be applied to the set of C reals to get a number (represented by C) of probabilities which sum to 1. Each probability may indicate a confidence score associated with a respective class. In one embodiment, calculating the average classifier works as follows: each environment-specific classifier (e.g., $w^1$, $w^2$) may include a function which may take x and produce C real numbers—vector of C reals (logits). The average may be represented by $$\frac{w(x)^1 + w(x)^2 \ldots + w(x)^n}{n}$$

and produce another real vector of length C (averaged logit). In one embodiment, a softmax operation may be applied over this averaged logit to arrive at a soft prediction (e.g., probability scores). The soft predictions may then be plugged into a loss function such as, for example, cross-entropy.

According to one embodiment, the IRM games (e.g., F-IRM game 204, V-IRM game 302) implemented by the IRM game program 110*a*, 110*b* may utilize a best response dynamics strategy to compute a Nash equilibrium, where the Nash equilibrium may be equivalent to the ensemble predictor 218. In field of game theory, best response dynamics may refer to a strategy or set of strategies which may produce the most favorable outcome for each player, given the other players' strategies. The Nash equilibrium may refer to the point in the game where each player has selected the best response to the other players' strategies (e.g., based on best response dynamics).

While playing the game, the IRM game program 110*a*, 110*b* may enable each environment to use the ensemble classifier 226 to make predictions associated with their respective datasets. However, the only set of actions available to each environment may include controlling their respective environment-specific classifier component of the ensemble classifier 226. Under best response dynamics, the environments (e.g., first environment 206, second environment 210) may play the game such that each environment may decide its rest response (e.g., modification to its environment-specific classifier) to minimize the risk or loss specific to its own environment.

According to one embodiment, the IRM game program 110*a*, 110*b* may calculate a performance of each environment using a respective loss or risk function. For example, the first environment 206 may include a first loss function $$228 \left( \text{e.g.}, R^1 \left( \frac{1}{|\mathcal{E}_{tr}|} \left[ \overline{w^1} + \sum_{q \neq 1} w^q \right] \circ \Phi \right) \right)$$

and the second environment 210 may include a second loss function $$230 \left( \text{e.g.}, R^2 \left( \frac{1}{|\mathcal{E}_{tr}|} \left[ \overline{w^2} + \sum_{q \neq 2} w^q \right] \circ \Phi \right) \right).$$

Each loss function may include a component representing the ensemble or average classifier and a component representing the representation, where the ensemble classifier may further include a component representing respective environment-specific classifiers. In F-IRM game 204, the loss functions may only be impacted by the ensemble classifier component since the representation may be fixed to the identity function. For example, in the first loss function $$228 \left( \text{e.g.}, R^1 \left( \frac{1}{|\mathcal{E}_{tr}|} \left[ \overline{w^1} + \sum_{q \neq 1} w^q \right] \circ \Phi \right) \right),$$

the ensemble classifier function $$\left( \text{e.g.}, \left( \frac{1}{|\mathcal{E}_{tr}|} \left[ \overline{w^1} + \sum_{q \neq 1} w^q \right] \right),$$

may include a component $w^1$ representing the respective environment-specific classifier 222. According to one embodiment, each environment may improve its performance (e.g., increase its utility) by modifying its respective environment-specific classifier to minimize its respective environment loss function.

According to one embodiment, the steps of the game may proceed using a round-robin schedule of updates. In each round of the game, every environment (e.g., environment 1, environment 2 . . . environment $|\mathcal{E}_{tr}|$) may take its turn (in a periodic manner with each environment going once) and minimize its respective loss or risk function and update the ensemble classifier 226.

For example, in a first round (e.g., k=1) of the round-robin updates, at event 1 (232), the ensemble classifier 226 may be trained in the first environment 206 using the corresponding dataset 208. According to one embodiment, the first environment 206 may receive feedback via the first loss function $$228 \left( \text{e.g.}, R^1 \left( \frac{1}{|\mathcal{E}_{tr}|} \left[ \overline{w^1} + \sum_{q \neq 1} w^q \right] \circ \Phi \right) \right)$$

and may modify the weights of the first environment-specific classifier 222 to minimize the first loss function 228. In one embodiment, each environment may implement stochastic learning with backpropagation. More specifically, each environment may calculate a stochastic gradient descent (SGD) of the respective loss function and modify the respective environment-specific classifier to minimize the respective loss function associated with each environment.

According to one embodiment, the ensemble classifier 226 may be updated after each environment-specific classifier is updated (e.g., may be referred to as sequential updates). For example, following the modifications to the first environment-specific classifier 222, the ensemble classifier 226 may be updated accordingly. According to another embodiment, the ensemble classifier 226 may be updated following modifications to all of the environment-specific classifiers. In this embodiment, all of the environment-specific classifier may be modified at the same time (e.g., may be referred to as parallel updates). The ensemble classifier 226 may be updated after the parallel updates to all of the environment-specific classifiers. For example, following one round of modifications to the first and second environment-specific classifiers 222, 224 (in parallel), the ensemble classifier 226 may be updated accordingly.

Continuing with the first round (e.g., k=1) of the round-robin updates, the second environment 210 may then take its turn at event 2 (234). In one embodiment, the second environment 210 may proceed in a manner similar to the process described at event 1 (232) with reference to the first environment 206. The second environment 210 may modify its respective environment-specific classifier 224 to minimize its respective second loss function 230. In this example, the ensemble classifier 226 may then be updated based on the modifications to the second environment-specific classifier 224 (e.g., sequential updates). According to one embodiment, the first round of the round-robin updates may proceed to the last environment in the set of environments (e.g., Environment $|\mathcal{E}_{tr}|$) at event $|\mathcal{E}_{tr}|$ (236) in a similar manner described above with reference to first and second environments 206, 210.

This cycle of round-robin updates may iterate until a maximum number of iterations (max-iterations) is reached. In one embodiment, the IRM game program 110*a*, 110*b* may define the max-iterations based on criterion such as, for example, maximum number of epochs (e.g., passes through the entire dataset) or desired value of training accuracy. In at least one embodiment, the max-iterations may be associated with the number of cycles necessary to compute the Nash equilibrium of the F-IRM game 204.

According to one embodiment, the ensemble predictor 218 may be determined at the Nash equilibrium of the FIRM game 204. In some embodiments, the Nash equilibrium of the F-IRM game 204 may generate a set of ensemble predictors 218. According to one embodiment, the IRM game program 110a, 110b may fix the representation 220 to an identity function, a previously described. As such, in various embodiments of the F-IRM game 204, the ensemble predictor 218 may be equivalent to the ensemble classifier 226. Further, it is contemplated that any ensemble predictor 218 obtained from solving the Nash equilibrium of the F-IRM game 204 over the training environments (e.g., environment 1, environment 2 . . . environment may perform as an invariant predictor across all unseen or new environments when deployed by a computing device.

Figure 3:
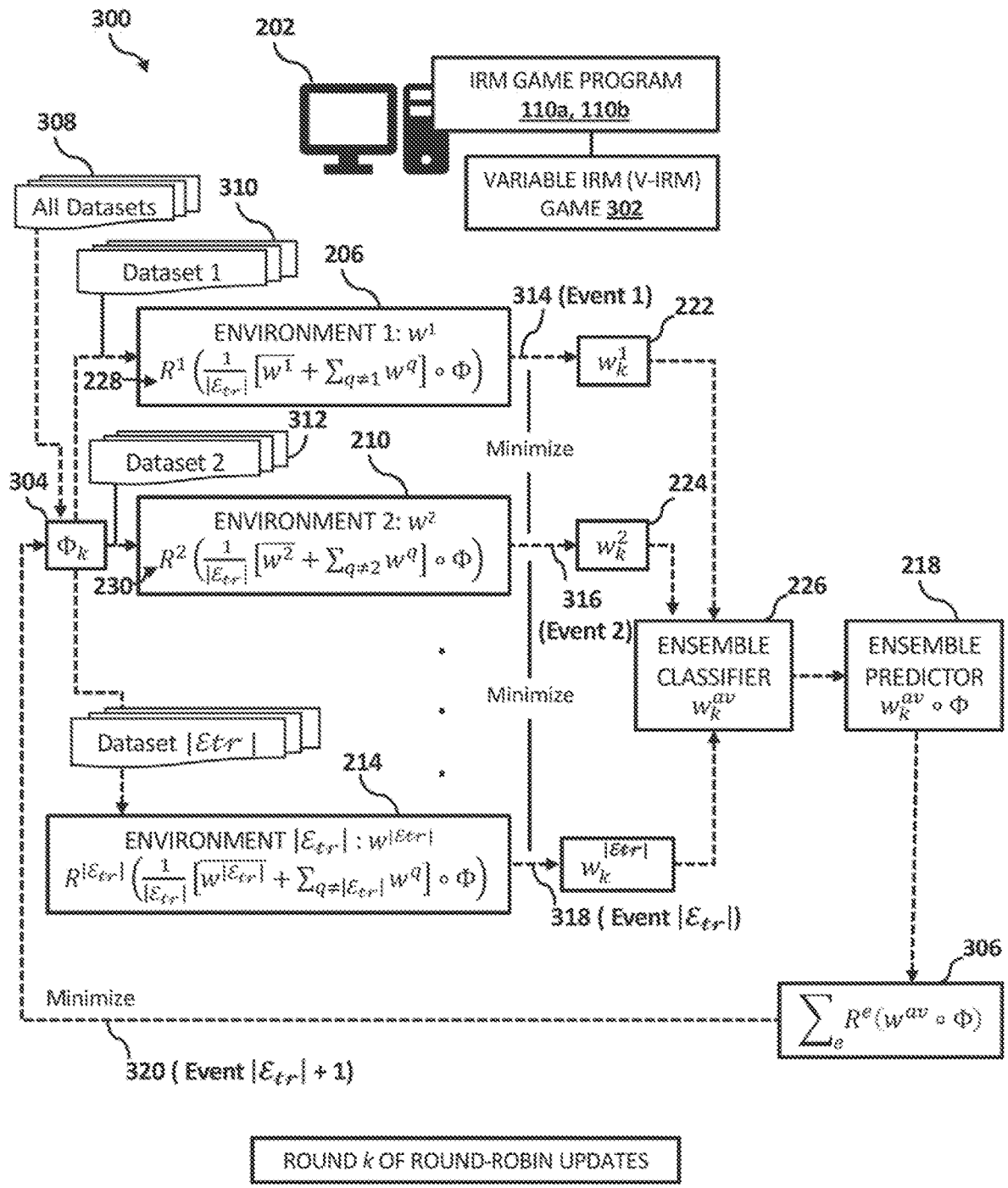
FIG. 3 is a schematic block diagram of a second machine learning environment according to at least one embodiment.

Referring now to FIG. 3, a schematic block diagram of a second machine learning environment 300 implementing the IRM game program 110a, 110b according to at least one embodiment is depicted. According to one embodiment, second machine learning environment 300 may include one or more components (e.g., client computer 102; server computer 112; communication network 116) of the computer environment 100 discussed above with reference to FIG. 1. In at least one embodiment, second machine learning environment 300 may include other components which may be similar to first machine learning environment 200. As such, similar components may share the same reference numbers between FIG. 2 and FIG. 3.

According to one embodiment, machine learning environment 300 may be implemented using one or more computer systems 202 running the IRM game program 110a, 110b. Further, machine learning environment 300 may include training environments (e.g., environment 1 (first environment 206), environment 2 (second environment 210) . . . environment $|\varepsilon_{tr}|$ (additional environments 214)). In one embodiment, the IRM game program 110a, 110b may define a respective environment-specific classifier for each corresponding environment. For example, the first environment 206 may select (or be assigned) a first environment-specific classifier 222 (e.g., $w_k^1$) and the second environment 210 may select (or be assigned) a second environment-specific classifier 224 (e.g., $w_k^2$). According to one embodiment, the various environment-specific classifiers may be aggregated to construct the ensemble classifier 226 and the ensemble classifier 226 may be used to determine the ensemble predictor 218 after solving the IRM game initiated by the IRM game program 110a, 110b.

As described previously, the IRM game program 110a, 110b may include two approaches to the IRM game. The first approach, referred to as a fixed representation based best response training (F-IRM game 204), was described with reference to FIG. 2. According to at least one embodiment, the second approach, referred to as a variable representation based best response training (V-IRM game 302), may be implemented by the second machine learning environment 300, as will be detailed further with reference to FIG. 3.

According to one embodiment, in the V-IRM game 302, the IRM game program 110a, 110b may define a representation learner 304 (may also be referred to as a representation) which may be variable, unlike the fixed representation 220 in F-IRM game 204. In at least one embodiment, the representation learner 304 may be updated periodically (e.g., to modify the representation) to minimize a total loss function 306 (e.g., $\Sigma_e R^e(w^{av} \cdot \Phi)$) associated with the representation 304.

Another difference in the training process between the F-IRM game 204 and the V-IRM game 302 may be found in the handling of the various training datasets. In V-IRM game 302, the representation learner 304 may first receive all datasets 308 before the respective datasets are fed into the corresponding environments. In one embodiment, a goal of the representation learner 304 may be to transform the data (e.g., in all datasets 308) such that the ensemble classifier 226 may learn the causal features to generate a robust predictor (e.g., ensemble predictor 218). The transformed datasets may then be transmitted to the corresponding environments. For example, a first dataset 310 (e.g., Dataset 1) may include a first set of transformed data for first environment 206 and a second dataset 312 (e.g., Dataset 2) may include a second set of transformed data for second environment 210. The first and second datasets 310, 312 may initially be included in the all datasets 308 received by the representation learner 304. Following the transformation of the data in the all datasets 308, the first and second datasets 310, 312 may be fed to the corresponding environments.

According to one embodiment, the V-IRM game 302 implemented by the IRM game program 110a, 110b may also utilize the best response dynamics strategy to compute a Nash equilibrium, where the Nash equilibrium may be equivalent to the ensemble predictor 218. In V-IRM game 302, the representation learner 304 may be updated periodically (e.g., once per round k of round-robin updates) and each environment may play the game according to best response dynamics (as described with reference to FIG. 2, e.g., take its turn and update the environment-specific classifier to minimize loss function) between two updates (e.g., sequential updates) of the representation learner 304.

For example, in a first round (e.g., k=1) of the round-robin updates, at event 1 (314), the first environment 206 (including data transformed by the representation learner 304) may minimize the respective loss function 228 by modifying the respective environment-specific classifier 222, as described previously with reference to FIG. 2. The ensemble classifier 226 may then be updated based on the modifications to the first environment-specific classifier 222. According to one embodiment, the ensemble classifier 226 may be updated based on sequential updates (e.g., following each environment-specific classifier) or parallel updates (e.g., following parallel updates to all of the environment-specific classifiers), as described previously with reference to FIG. 2.

Continuing with the first round (e.g., k=1) of the round-robin updates, the second environment 210 (including data transformed by the representation learner 304) may then take its turn at event 2 (316) and proceed in a manner similar to the process described at event 1 (314) with reference to the first environment 206. The second environment 210 may modify its respective environment-specific classifier 224 to minimize its respective second loss function 230. The ensemble classifier 226 may then be updated based on the modifications to the second environment-specific classifier 224. According to one embodiment, the first round of the round-robin updates may proceed to the last environment (e.g., environment $|\varepsilon_{tr}|$) at event $|\varepsilon_{tr}|$ (318) in a similar manner as described above with reference to the first and second environments 206, 210. Once all the environments have taken a turn in the first round (e.g., k=1) of the round-robin updates, at event $|\varepsilon_{tr}|+1$ (320), the representation learner 304 may modify the representation to minimize the total loss function 306 (e.g., using SGD with backpropagation). In one embodiment, the IRM game program 110a, 110b may calculate the total loss function 306 by aggregating the respective environment-specific loss functions (e.g., environment-specific classifier 222, environment-specific classifier 224). Between the first round (e.g., k=1) update and a second round (e.g., k=2) of the representation learner 304, each environment may take its turn to play the game according to the best response dynamics strategy described above.

According to one embodiment, the cycle of round-robin updates in the V-IRM game 302) may iterate until the max-iterations is reached. In at least one embodiment, the max-iterations may be associated with the number of cycles necessary to compute the Nash equilibrium of the V-IRM game 302.

According to one embodiment, the ensemble predictor 218 may be determined at the Nash equilibrium of the V-IRM game 302. In some embodiments, the Nash equilibrium of the V-IRM game 302 may generate a set of ensemble predictors 218. According to one embodiment, the ensemble predictor 218 in the V-IRM game 302 may be different from the ensemble classifier 226 in that the ensemble predictor 218 may be composed of the ensemble classifier 226 and the representation updated by the representation learner 304 to minimize the total loss function 306.

Further, it is contemplated that any ensemble predictor 218 obtained from solving the Nash equilibrium of the V-IRM game 302 over the training environments (e.g., environment 1, environment 2 . . . environment may perform as an invariant predictor across all unseen or new environments when deployed by a computing device.

Figure 4:
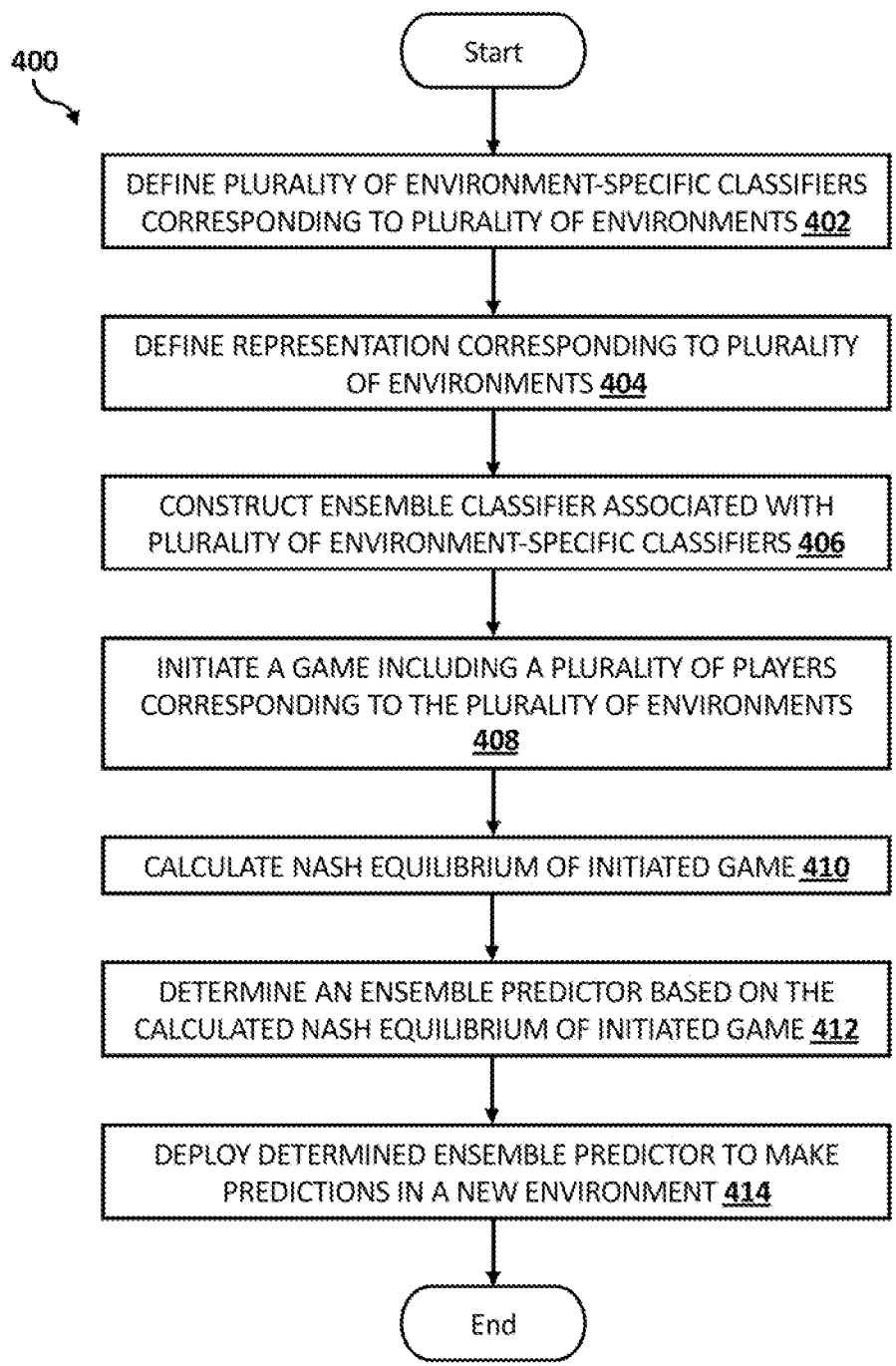
FIG. 4 is an operational flowchart illustrating a process for best response training according to at least one embodiment.

Referring now to FIG. 4, an operational flowchart illustrating an exemplary best response training process 400 used by the IRM game program 110a, 110b according to at least one embodiment is depicted. The best response training process 400 may be described with reference to FIGS. 2 and 3.

At 402, a plurality of environment-specific classifiers corresponding to a plurality of environments are defined. According to one embodiment, the IRM game program 110a, 110b may implement multiple environments (e.g., training environments), as described with reference to FIGS. 2 and 3. According to one embodiment, the IRM game program 110a, 110b may endow each environment with its own environment-specific classifier, which may be selected from a set of all classifiers (e.g., selected from linear and non-linear classifiers).

Then at 404, a representation corresponding to the plurality of environments is defined. According to one embodiment, the type of representation implemented by the IRM game program 110a, 110b may dictate a respective approach to the best response training process 400. If the representation is fixed to an identity function, process 400 may proceed as a fixed representation based best response training process in which the IRM game program 110a, 110b may implement the FIRM game, as described previously with reference to FIG. 2. However, if the representation indicates a variable representation which may be updated by a representation learner, process 400 may proceed as a variable representation based best response training process in which the IRM game program 110a, 110b may implement the V-IRM game, as described previously with reference to FIG. 3.

Then at 406, an ensemble classifier associated with the plurality of environment-specific classifiers is constructed. The IRM game program 110a, 110b may implement an average or ensemble classifier to learn features which have a causal relationship with the outcome from a wide distribution of training data. According to one embodiment, the IRM game program 110a, 110b may construct the ensemble classifier based on the environment-specific classifiers associated with the multiple environments. In at least one embodiment, the environment-specific classifiers may be provided as components of the ensemble classifier, such that the ensemble classifier may be calculated as an aggregation or average of the individual components (e.g., environment-specific classifiers), as described with reference to FIG. 2.

Then at 408, a game is initiated including a plurality of players corresponding to the plurality of environments. According to one embodiment, the IRM game program 110a, 110b may initiate a F-IRM game, as described with reference to FIG. 2 or a V-IRM game, as described with reference to FIG. 3, depending on the representation learner defined by the IRM game program 110a, 110b. Notwithstanding the type of game initiated by the IRM game program 110a, 110b, each environment (e.g., training environment), may represent a corresponding player in the game, as described previously with reference to FIGS. 2 and 3.

Then at 410, a Nash equilibrium of the initiated game is calculated. According to one embodiment, the IRM games (e.g., F-IRM game, V-IRM game) implemented by the IRM game program 110a, 110b may utilize a best response dynamics strategy to compute a Nash equilibrium. As described with reference to FIG. 2, in the field of game theory, best response dynamics may refer to a strategy or set of strategies which may produce the most favorable outcome for each player (e.g., each environment), given the other players' strategies (e.g., other environments' strategies). The Nash equilibrium may refer to the point in the game where each player has selected the best response to the other players' strategies (e.g., based on best response dynamics).

According to one embodiment, the IRM game program 110a, 110b may enable each environment to use the ensemble classifier to make predictions associated with their respective datasets. However, the only set of actions available to each environment may include controlling their respective environment-specific classifier component of the ensemble classifier.

According to one embodiment, in the F-IRM game, (e.g., representation fixed to identity function), each environment may take its turn and update its respective environment-specific classifier to improve the utility of the respective environment-specific classifier (e.g., minimize loss function specific to its own environment). This cycle may continue until max-iterations of the F-IRM game resulting in the Nash Equilibrium.

According to one embodiment, in the V-IRM game (e.g., representation variable), the representation learner defined by the IRM game program 110a, 110b may periodically update the representation to minimize its total risk (e.g., minimize total loss function). Between two updates of the representation by the representation learner, each environment may take its turn and update its respective environment-specific classifier to improve the utility of the respective environment-specific classifier. This cycle may continue until max-iterations of the V-IRM game resulting in the Nash Equilibrium.

Then at 412, an ensemble predictor is determined based on the calculated Nash equilibrium of the initiated game. According to one embodiment, one or more ensemble predictors may be generated as an output for solving the FIRM or V-IRM game initiated by the IRM game program 110a, 110b. Since each game implements the best response dynamics strategy to compute a Nash equilibrium, solving the game for the Nash equilibrium may result in determining the one or more ensemble predictors.

According to one embodiment, the ensemble predictor may be composed of the ensemble classifier and the representation. In a F-IRM game, where the representation may be fixed to an identity function, the ensemble predictor may be equivalent to the ensemble classifier. However, in a V-IRM game, where the representation may be variable, the ensemble predictor may be different from the ensemble classifier and may depend on the final representation generated by the representation learner.

Thereafter at 414, the determined ensemble predictor is deployed to make predictions in a new environment. By implementing the above-described best response training process 400, the IRM game program 110a, 110b may construct a robust ensemble predictor which may perform well (e.g., invariantly) across many new (e.g., unseen) environments, where the new environments may represent a superset of the set of training environments, as described previously with reference to FIGS. 2 and 3.

The IRM game program 110a, 110b may improve the functionality of a computer because the IRM game program 110a, 110b may enable the computer to build robust predictors which may perform successfully in new environments where the distribution of the data is unknown. The IRM game program 110a, 110b may enable operationalizing machine learning in domains such as, computer vision and natural language processing. For example, the IRM game program 110a, 110b may enable training a self-driving car to apply its car brakes based on features beyond just detecting the brake lights of the car in front. As such, if a situation requires applying the brakes, a self-driving car model trained using the IRM game program 110a, 110b may apply the car brakes, even if the brake lights of the car in front is not visible.

It may be appreciated that FIGS. 2 to 4 provide only an illustration of one embodiment and do not imply any limitations with regard to how different embodiments may be implemented. Many modifications to the depicted embodiment(s) may be made based on design and implementation requirements.

Figure 5:
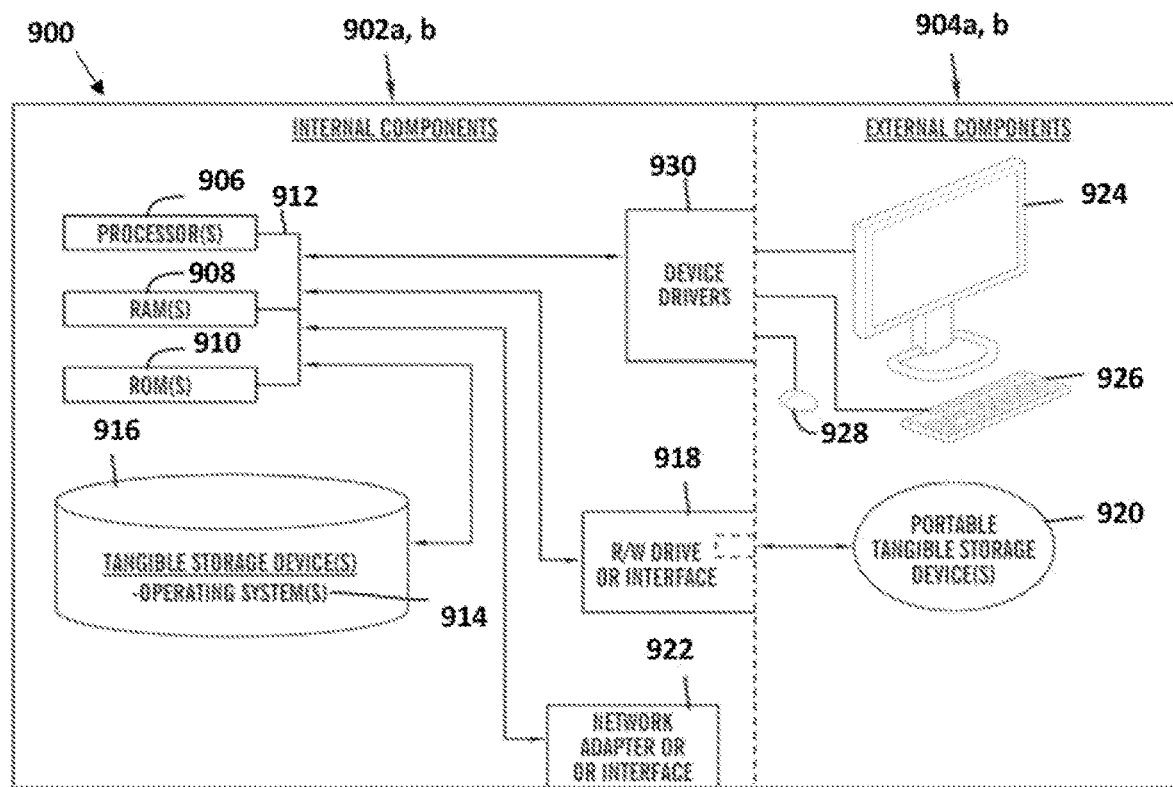
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the IRM game program 110a in client computer 102, and the IRM game program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the IRM game program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the IRM game program 110a in client computer 102 and the IRM game program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the IRM game program 110a in client computer 102 and the IRM game program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
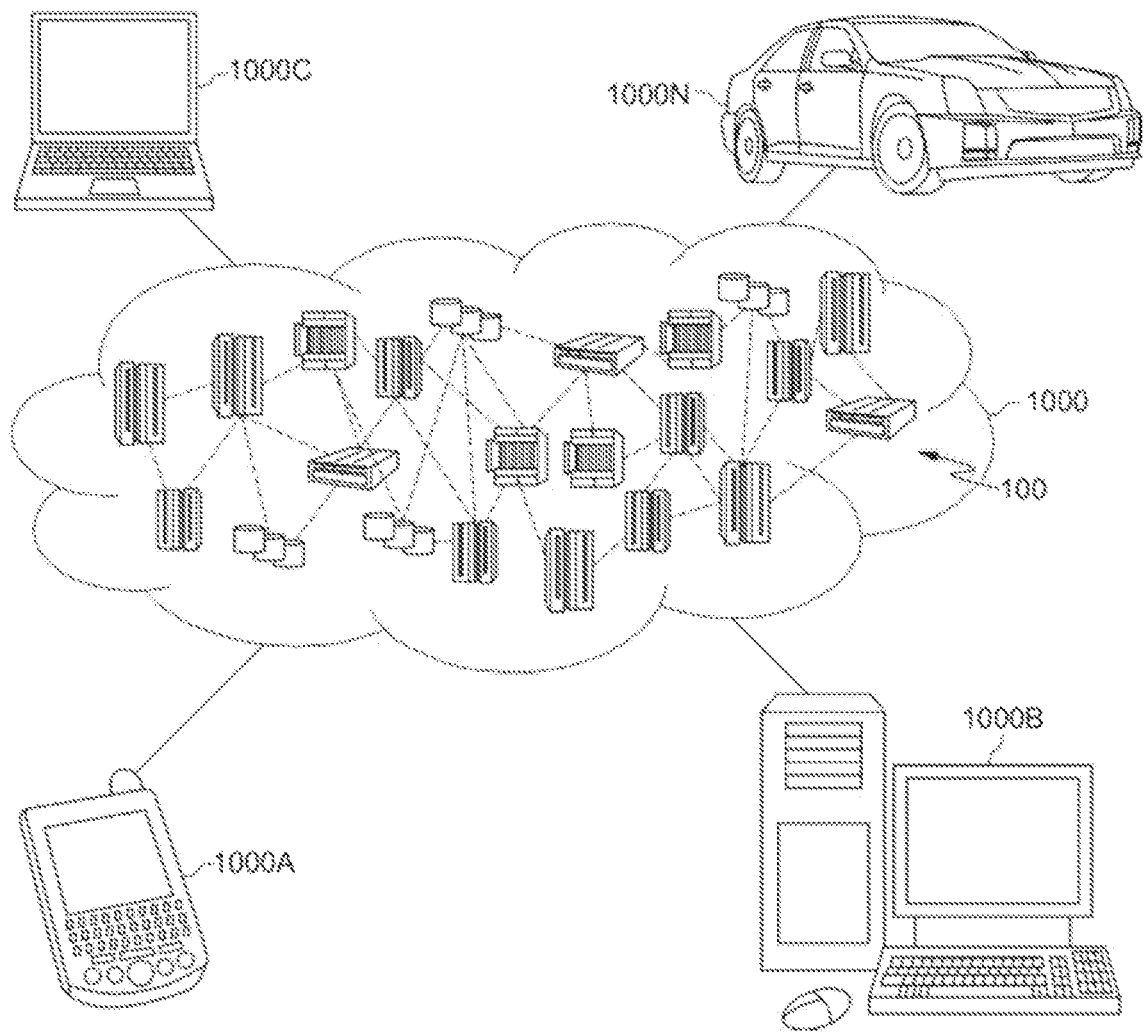
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
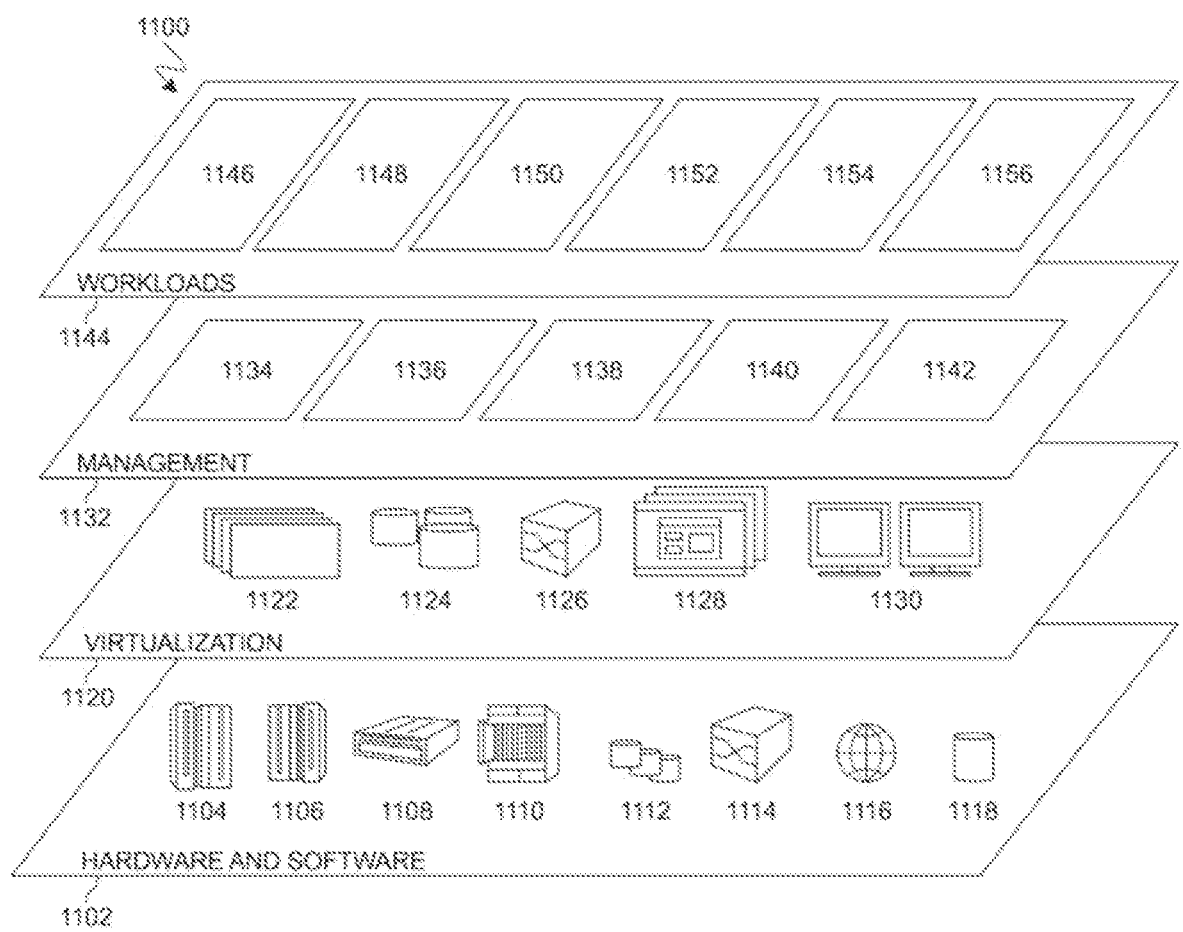
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and machine learning 1156. A IRM game program 110a, 110b provides a way to build robust predictors which may perform successfully in new environments where the distribution of the data is unknown.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
defining, by a computing device, a plurality of environment-specific classifiers corresponding to a plurality of environments;
constructing, by the computing device, an ensemble classifier associated with the plurality of environment-specific classifiers;
initiating, by the computing device, a game including a plurality of players corresponding to the plurality of environments, wherein the initiated game comprises;
training, by the computing device, the constructed ensemble classifier by each environment of the plurality of environments;
modifying, by the computing device, a respective environment-specific classifier by a corresponding environment of the plurality of environments based on feedback to improve performance of the modified respective environment-specific classifier in the corresponding environment; and
updating, by the computing device, the trained constructed ensemble classifier based on the modified respective environment-specific classifier;
calculating, by the computing device, a nash equilibrium of the initiated game;
determining, by the computing device, an ensemble predictor based on the calculated nash equilibrium of the initiated game; and
deploying, by the computing device, the determined ensemble predictor as an invariant predictor to make predictions in a new environment.

2. The method of claim 1, wherein the calculated nash equilibrium of the initiated game includes a best response dynamics strategy.

3. The method of claim 1, further comprising:
receiving a corresponding dataset for each environment of the plurality of environments, wherein the received corresponding dataset for each environment includes an arbitrary distribution of data.

4. The method of claim 1, further comprising:
defining a representation corresponding to the plurality of environments; and
fixing the defined representation to an identity function.

5. The method of claim 1, further comprising:
defining a representation corresponding to the plurality of environments; and
updating the defined representation periodically by a representation learner to minimize a total loss function associated with the defined representation.

6. The method of claim 1, further comprising:
modifying the plurality of environment-specific classifier in parallel; and
updating the constructed ensemble classifier responsive to the modified plurality of environment-specific classifiers in parallel.

7. The method of claim 1, wherein the determined ensemble predictor includes the constructed ensemble classifier updated based on minimizing a respective loss function associated with each environment of the plurality of environments.

8. The method of claim 7, wherein the determined ensemble predictor further comprises a representation updated to minimize a total loss function associated with the representation.

9. The method of claim 5, further comprising:
modifying the plurality of environment-specific classifiers by the plurality of environments, respectively, to minimize a respective loss function associated with each environment of the plurality of environments between two updates of the defined representation.

10. A computer system for invariant risk minimization games, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
defining a plurality of environment-specific classifiers corresponding to a plurality of environments;
constructing an ensemble classifier associated with the plurality of environment-specific classifiers;
initiating a game including a plurality of players corresponding to the plurality of environments, wherein the initiated game comprises;
training the constructed ensemble classifier by each environment of the plurality of environments;
modifying a respective environment-specific classifier by a corresponding environment of the plurality of environments based on feedback to improve performance of the modified respective environment-specific classifier in the corresponding environment; and updating the trained constructed ensemble classifier based on the modified respective environment-specific classifier;

calculating a nash equilibrium of the initiated game;

determining an ensemble predictor based on the calculated nash equilibrium of the initiated game; and deploying the determined ensemble predictor as an invariant predictor to make predictions in a new environment.

11. The computer system of claim 10, wherein the calculated nash equilibrium of the initiated game includes a best response dynamics strategy.

12. The computer system of claim 10, further comprising:
receiving a corresponding dataset for each environment of the plurality of environments, wherein the received corresponding dataset for each environment includes an arbitrary distribution of data.

13. The computer system of claim 10, further comprising:
defining a representation corresponding to the plurality of environments; and
fixing the defined representation to an identity function.

14. The computer system of claim 10, further comprising:
defining a representation corresponding to the plurality of environments; and
updating the defined representation periodically by a representation learner to minimize a total loss function associated with the defined representation.

15. The computer system of claim 10, further comprising:
modifying the plurality of environment-specific classifier in parallel; and
updating the constructed ensemble classifier responsive to the modified plurality of environment-specific classifiers in parallel.

16. The computer system of claim 10, wherein the determined ensemble predictor includes the constructed ensemble classifier updated based on minimizing a respective loss function associated with each environment of the plurality of environments.

17. The computer system of claim 10, wherein the determined ensemble predictor further comprises a representation updated to minimize a total loss function associated with the representation.

18. A computer program product for invariant risk minimization games, comprising:
one or more computer-readable storage media and program instructions collectively stored on the one or more computer-readable storage media, the program instructions executable by a processor to cause the processor to perform a method comprising:
defining a plurality of environment-specific classifiers corresponding to a plurality of environments;
constructing an ensemble classifier associated with the plurality of environment-specific classifiers;
initiating a game including a plurality of players corresponding to the plurality of environments, wherein the initiated game comprises;
training the constructed ensemble classifier by each environment of the plurality of environments;
modifying a respective environment-specific classifier by a corresponding environment of the plurality of environments based on feedback to improve performance of the modified respective environment-specific classifier in the corresponding environment; and
updating the trained constructed ensemble classifier based on the modified respective environment-specific classifier;
calculating a nash equilibrium of the initiated game;
determining an ensemble predictor based on the calculated nash equilibrium of the initiated game; and
deploying the determined ensemble predictor as an invariant predictor to make predictions in a new environment.

* * * * *